US011942885B2

(12) United States Patent
Spitz

(10) Patent No.: US 11,942,885 B2
(45) Date of Patent: Mar. 26, 2024

(54) DEVICE AND METHOD FOR ACTIVATING A CONVEYOR DEVICE

(71) Applicant: Robert Bosch GmbH, Stuttgart (DE)

(72) Inventor: Jonathan Spitz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 121 days.

(21) Appl. No.: 17/775,463

(22) PCT Filed: Nov. 5, 2020

(86) PCT No.: PCT/EP2020/081110
§ 371 (c)(1),
(2) Date: May 9, 2022

(87) PCT Pub. No.: WO2021/104829
PCT Pub. Date: Jun. 3, 2021

(65) Prior Publication Data
US 2022/0399845 A1 Dec. 15, 2022

(30) Foreign Application Priority Data
Nov. 28, 2019 (DE) ...................... 10 2019 218 497.9

(51) Int. Cl.
*H02P 25/064* (2016.01)
*B65G 43/00* (2006.01)
(Continued)

(52) U.S. Cl.
CPC ............ *H02P 25/064* (2016.02); *B65G 43/00* (2013.01); *G05D 17/02* (2013.01); *B65G 47/00* (2013.01); *B65G 2203/0283* (2013.01)

(58) Field of Classification Search
CPC ....... H02P 25/064; B65G 43/00; B65G 47/00; B65G 2203/0283; B65G 54/02;
(Continued)

(56) References Cited

U.S. PATENT DOCUMENTS 4,675,582 A * 6/1987 Hommes ............... B60L 15/005
318/135

FOREIGN PATENT DOCUMENTS

| DE | 102016224951 A1 | 6/2018 |
| DE | 102018209725 A1 | 12/2019 |
| DE | 102018125471 A1 | 4/2020 |

OTHER PUBLICATIONS

International Search Report for PCT/EP2020/081110, dated Feb. 10, 2021.

* cited by examiner

*Primary Examiner* — David Luo
(74) *Attorney, Agent, or Firm* — NORTON ROSE FULBRIGHT US LLP; Gerard A. Messina

(57) ABSTRACT

A device and method for activating a conveyor device. An actual value for a pose of a device movable by the conveyor device by a magnetic force action is received. Depending on the actual value for the pose, as a function of a setpoint value for a torque, as a function of a setpoint value for a force, and as a function of a model, a setpoint value for the activation of at least one actuator of the conveyor device is determined. The model is trained to determine setpoint values for the activation of the at least one actuator as a function of actual values for poses of the device and as a function of setpoint values for torques and setpoint values for forces, using which the device is to be moved.

15 Claims, 8 Drawing Sheets

(51) Int. Cl.
*B65G 47/00* (2006.01)
*G05D 17/02* (2006.01)

(58) Field of Classification Search
CPC ...... G05D 17/02; B23Q 15/00; G05B 13/027; G05B 17/02
USPC ................................ 318/135, 687, 671, 560
See application file for complete search history.

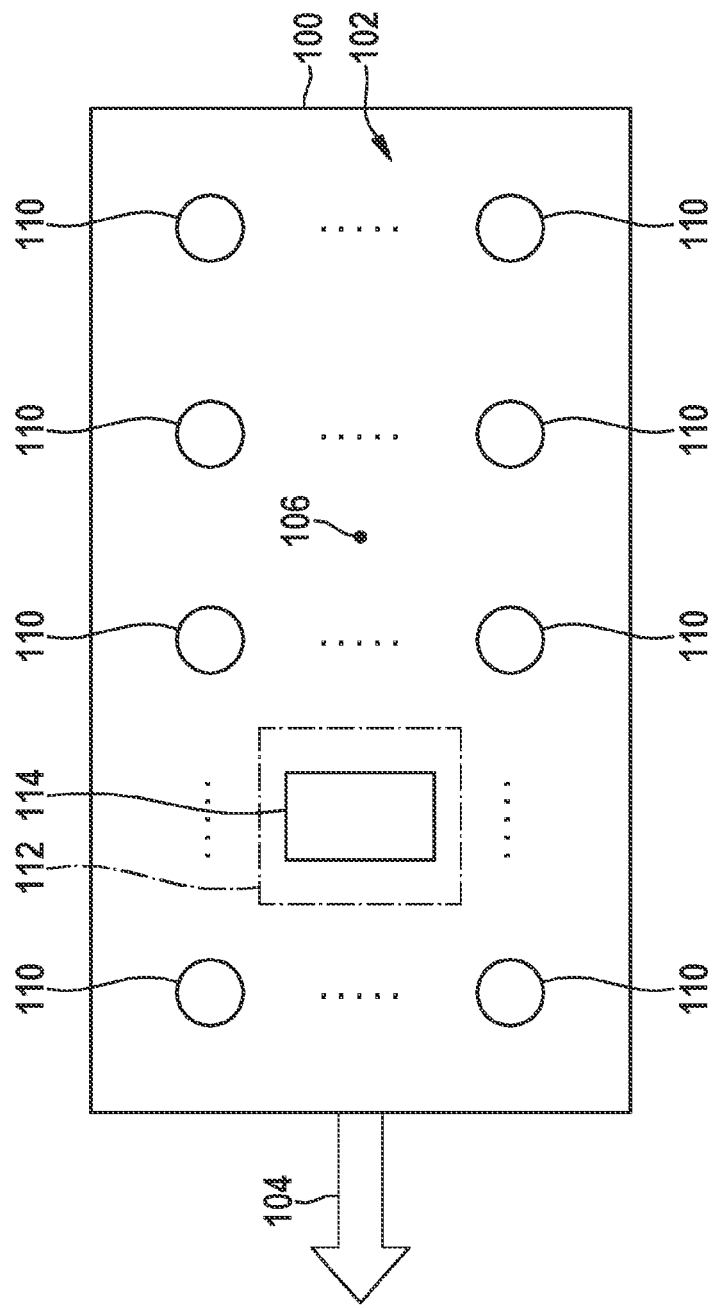
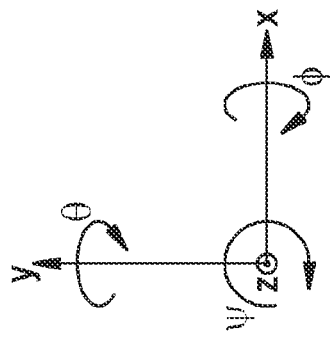
Fig. 1

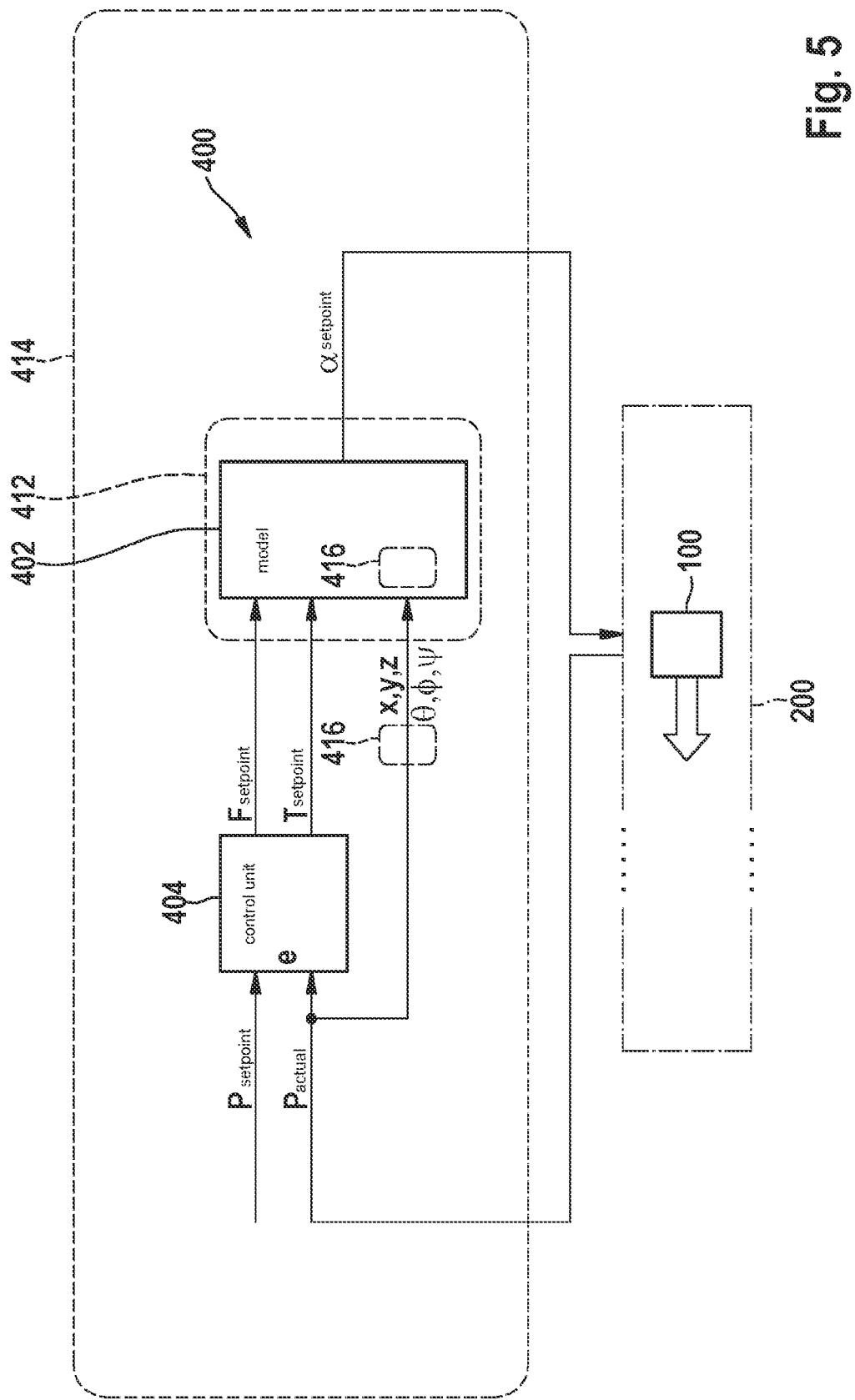

DEVICE AND METHOD FOR ACTIVATING A CONVEYOR DEVICE

BACKGROUND INFORMATION

Magnetic forces may be used to cause objects, which are influenceable with the aid of magnetic force action, to float or move. Conveyor devices which use these properties enable a movement of these objects without mechanical friction. Regulating such movement processes is extremely complex and therefore costly. It is therefore desirable to provide a robust control unit for this purpose with the least possible expenditure in computing power and computing time.

SUMMARY

This may be achieved by a device and a method for activating a conveyor device according to the present invention.

In accordance with an example embodiment of the present invention, the method provides that an actual value for a pose of a device movable by the conveyor device by a magnetic force action is received, as a function of the actual value for the pose, as a function of a setpoint value for a torque using which the device is to be moved by the conveyor device, as a function of a setpoint value for a force using which the device is to be moved by the conveyor device, and as a function of a model, a setpoint value for activating at least one actuator of the conveyor device being determined, the model being trained to determine setpoint values for the activation of the at least one actuator as a function of actual values for poses of the device and as a function of setpoint values for torques and setpoint values for forces using which the device is to be moved. The trained model, for example, an artificial neural network, maps the actual values for the pose, the setpoint values for the torque, and the setpoint values for the force efficiently on a particular setpoint value for the actuators. The setpoint values which are otherwise only obtainable by complex calculation are thus determined quickly in a model-based manner.

In accordance with an example embodiment of the present invention, the at least one actuator is preferably made rotatable with respect to the conveyor device, the setpoint value for the at least one actuator characterizing a rotation angle for the actuator with respect to the conveyor device or an increment for this rotation angle starting from a present rotation angle of the actuator, and the at least one actuator being activated as a function of the setpoint value for activating the at least one actuator. The output variables of the artificial neural network represent the rotation angles in this aspect. The result of the mapping is thus usable for individual actuators directly, i.e., without intermediate calculations. This enables the calculations to be implemented particularly quickly.

The at least one actuator preferably includes at least one permanent magnet, in particular a Halbach array, by which a magnetic field is generatable to influence a movement of the device, the model being trained to determine a plurality of setpoint values for rotation angles of various actuators. The output variables of the artificial neural network represent all relevant rotation angles in this aspect. This enables the calculations to be scaled to the required number of the actuators. The model is thus flexibly usable for different conveyor devices including different actuators.

A magnetic field for moving the device is preferably generatable by a superposition of magnetic fields of the at least one permanent magnet of a plurality of different actuators with magnetic fields of at least one electromagnet or permanent magnet at the device, the model being trained to determine the plurality of setpoint values for the rotation angles of the various actuators in such a way that the magnetic field moves the device essentially with the torque predefined by the setpoint value for the torque and the force predefined by the setpoint value for the force. The magnetic field is directly influenced by the mapping of the setpoint values using the artificial neural network. This reduces the computing effort significantly and enables shorter control cycles.

In another aspect of the present invention, the at least one actuator includes an electromagnetic element by which a magnetic field is generatable to move the device, the model being trained to determine a plurality of setpoint values for various actuators. If the actuator is not a permanent magnet but rather a coil, for example, this is not rotated but rather energized using a current which is predefined by the setpoint value.

In this aspect, a magnetic field for moving the device is generatable by a superposition of magnetic fields of a plurality of the electromagnetic elements of various actuators with a magnetic field of at least one electromagnet or permanent magnet at the device, the model being trained to determine the plurality of the setpoint values for the various actuators in such a way that the magnetic field moves the device essentially using the torque predefined by the setpoint value for the torque and the force predefined by the setpoint value for the force.

Preferably, in accordance with an example embodiment of the present invention, a plurality of actuators is assigned to a group of actuators as a function of the actual value for the pose, the magnetic field for influencing a movement of the device only being generated by the group of actuators. The artificial neural network may thus be dimensioned smaller in accordance with a number of actuators in the group. This significantly reduces the computing effort and enables shorter control cycles.

A control deviation for a control unit is preferably determined as a function of the actual value for the pose and a setpoint value for the pose, the control unit determining the setpoint value for the torque and the setpoint value for the force as a function of the control deviation. The control unit may be a PID controller, using which the control of the pose according to a setpoint trajectory is easily possible. The activation of the actuators, which is complex in relation thereto, for the movement of the device along the setpoint trajectory is particularly efficiently implemented in this case by the artificial neural network.

The control unit is preferably a state regulator, in particular an LQ controller, a trajectory for setpoint values being predefined for the pose and the setpoint value for the torque and the setpoint value for the force being determined as a function of the trajectory.

A pilot control value for the setpoint value for the torque and/or the setpoint value for the force is preferably determined as a function of a gravitational force acting on the device, which at least partially compensates for the gravitational force.

In accordance with an example embodiment of the present invention, for a training of the model, as a function of the setpoint value for the activation of the at least one actuator of the conveyor device and as a function of an in particular stochastic or deterministic forward model of the conveyor device and the device, a modeled value may be determined for the torque and a modeled value may be determined for the force, at least one parameter of the model being determined as a function of the modeled value for the torque, the modeled value for the force, a desired value for the torque, and a desired value for the force.

The forward model may be made very complex and very computing time intensive or very computing power intensive in the training. In particular, a very accurate forward model may be used. The model thus trained may thus carry out particularly accurate mapping, which significantly improves the control quality as a whole.

Preferably, a plurality of tuples including a pose, a desired value for the torque, and a desired value for the force is provided, the at least one parameter of the model being determined as a function of the plurality of tuples in a gradient descent method.

In accordance with the present invention, a corresponding device includes at least one computing unit and at least one memory for a model and a control unit, which are designed to carry out the method.

Further advantageous specific embodiments result from the following description and the figures.

BRIEF DESCRIPTION OF THE DRAWINGS

FIG. 1 shows a schematic representation of a device in a top view, in accordance with an example embodiment of the present invention.

FIG. 5 shows a schematic view of the device for activating the conveyor device without training device, in accordance with an example embodiment of the present invention.

DETAILED DESCRIPTION OF EXAMPLE EMBODIMENTS

Figure 2:
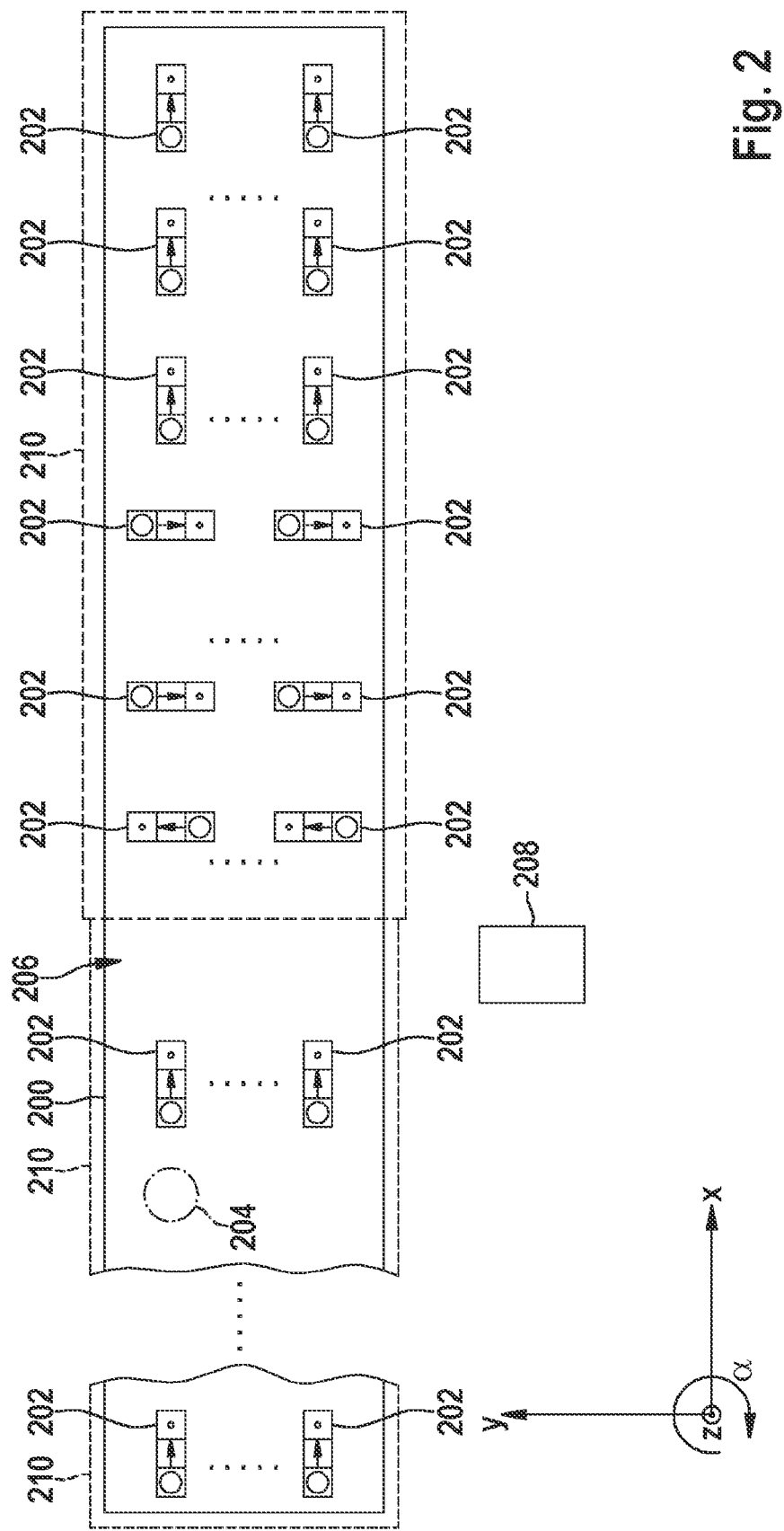
FIG. 2 shows a schematic representation of a conveyor device in a top view, in accordance with an example embodiment of the present invention.

FIG. 1 schematically shows a device 100 in a top view. In the example, device 100 includes a receptacle 102 for the transport of objects. Receptacle 102 may be designed as a surface, trough, or grating. Device 100 is designed in the example for the purpose of moving one or multiple objects in a movement direction 104 of device 100.

A Cartesian coordinate system including x axis, y axis, and z axis is shown in FIG. 1. A position of device 100 is indicated in the example with reference to an origin of the Cartesian coordinate system. In the example, a position of a point 106 is defined as the position of device 100, which is located in the example in the center of a receptacle 102 designed as a surface. Other definitions of the position, for example, based on polar or cylinder coordinates, are also possible. Point 106 may be situated at another point of device 100. Device 100 is movable with respect to this coordinate system in the example.

One pose of device 100 is defined in the example by the position, a roll angle $\phi$ around the x axis, a pitch angle $\theta$ around the y axis, and a yaw angle $\Psi$ around the z axis. It may be provided that a Cartesian coordinate system fixed with respect to device 100 is defined, roll angle $\phi$ being defined around a x axis, pitch angle $\theta$ being defined around a y axis, and yaw angle $\Psi$ being defined around a z axis of this fixed Cartesian coordinate system.

Device 100 includes at least one driving element 110. In the example, driving element 110 includes a permanent magnet. Instead of a permanent magnet, a magnetic coil may also be provided.

The at least one driving element 110 is designed in the example as a permanent magnet. Optionally, at least one magnetic coil may be provided alternatively or additionally to the permanent magnet as driving element 110. In this case, a control unit 112 may be provided, which is designed in this aspect to activate the at least one driving element 110 for a movement of device 100. Electrical lines for the activation connect control unit 112 to the at least one driving element 110. These are not shown in FIG. 1.

Device 100 may include an energy store 114, which is designed to supply control unit 112 and the at least one driving element 110 with electrical energy. Electrical lines for the energy supply connect energy store 114 to control device 112 and the at least one driving element 110. These are not shown in FIG. 1. Energy store 114 is a battery in the example. Instead of a battery, a capacitor may also be provided. Instead of energy store 114, a current collector may also be provided for the permanent energy supply of device 100.

In the example, device 100 includes a plurality of driving elements 110, which are situated in a matrix-shaped arrangement schematically shown in the top view in FIG. 1. In the example, two rows each including 13 permanent magnets are provided, which extend in the x direction and form columns in the y direction, i.e., a total of 26 permanent magnets are provided.

If device 100 moves with respect to the coordinate system, the pose changes, i.e., the matrix-shaped arrangement of driving elements 110 moves in the coordinate system and may rotate, roll, pitch, and/or yaw.

A top view of a conveyor device 200 is schematically shown in FIG. 2. The Cartesian coordinate system is shown in FIG. 2. Conveyor device 200 is fixed with respect to the Cartesian coordinate system. Conveyor device 200 includes a plurality of actuators 202. In the example, seen in the top view, the actuators are situated in the form of a matrix in rows, which extend in the x direction and form columns in the y direction. In the example, each of actuators 202 includes at least one permanent magnet. In the example, a Halbach array or a Halbach element is provided. The Halbach array includes three permanent magnets of different magnetic orientation in the example. In the example, the three permanent magnets are situated in one row. One of the outer permanent magnet elements is oriented in the example in such a way that the magnetic north pole points in the negative z direction. This is indicated in FIG. 2 by a circle. The other of the outer permanent magnet elements is oriented in the example in such a way that the magnetic north pole points in the positive z direction. This is indicated in FIG. 2 by a dot. A middle magnet element situated between the two outer permanent magnets is oriented in such a way that its north pole points toward the element pointing in the positive z direction. Another magnetic orientation is also possible. It is also possible to provide electromagnets instead of the permanent magnets.

In the example, conveyor device 200 includes at least one receiver device 204, which is schematically shown in the top view in FIG. 1. The at least one receiver device 204 is designed in the example to receive information about a pose of device 100. Receiver device 204 is designed in the example to receive information about a position of device 100.

In the example, each of actuators 202 includes an electric motor, which is designed to rotate the Halbach array around an axis of rotation which is situated in parallel to the z axis. A magnetic field generated in sum by a superposition of the individual magnetic fields of all actuators 202 on a conveyor side 206 of conveyor device 200 may thus be deliberately influenced. The magnetic field is used, on the one hand, to repel the permanent magnets of device 100 in order to establish a distance from conveyor device 200. On the other hand, the magnetic field is used to move device 100 with respect to conveyor device 200.

An activation device 208 is designed to activate actuators 202. In the example, a rotation angle α around the axis of rotation of this actuator 202 is set by activation device 208 for an actuator 202. In the example, activation device 208 is designed to activate each of actuators 202 individually using a separate rotation angle α. Activating groups of actuators 202 jointly using the same rotation angle may also be provided.

Activation device 208 is designed to receive sensor signals from receiving devices 204.

Electrical lines connect activation device 208 for activating actuators 202 to actuators 202 in the example. Electrical lines connect activation device 208 for detecting sensor signals to the at least one receiving device 204 in the example.

In the example, viewed from the right, the first three columns of actuators 202 are aligned in parallel to the x direction. This corresponds in the example to a particular rotation angle α=0°. The two columns of actuators 202 adjoining to the left thereon are rotated by 90° clockwise in this example. This corresponds in the example to a particular rotation angle α=+90°. The column of actuators 202 adjoining to the left thereon is rotated by 90° counterclockwise in this example. This corresponds in the example to a particular rotation angle α=−90°. Actuators 202 adjoining to the left thereon are aligned in this example like the first three columns. In the example, this means a particular rotation angle α=0°.

Device 100 or a sensor system is designed in the example to send a present pose of device 100 to the at least one receiving device 204. Device 100 or the sensor system is designed in the example to send a present position of device 100 to the at least one receiving device 204. It is unimportant for the activation how the pose or the position of device 100 is determined in the Cartesian coordinate system. The pose or the position is received during operation of conveyor device 200, for example, continuously, for example, cyclically or at irregular time intervals, by receiving device 204.

A determination of the pose and/or a position determination is carried out repeatedly during operation of conveyor device 200.

Activation device 208 may also be designed to receive information about the pose using receiving device 204 and to determine the pose therefrom. A piece of information about the pose of device 100 may be generated in different ways. For the operation of activation device 208, it is unimportant how the actual value for the pose is determined. For example, a sensor or a camera-based system may be provided for determining the pose. The position determination may take place as a function of information about a position which is received at receiving device 204.

It may be provided that as a function of a last known pose of device 100, only those actuators 202 are activated, which, knowing the geometry of device 100 and conveyor device 200, may provide a significant contribution to the movement of device 100. This significantly reduces the amount of data.

Figure 3:
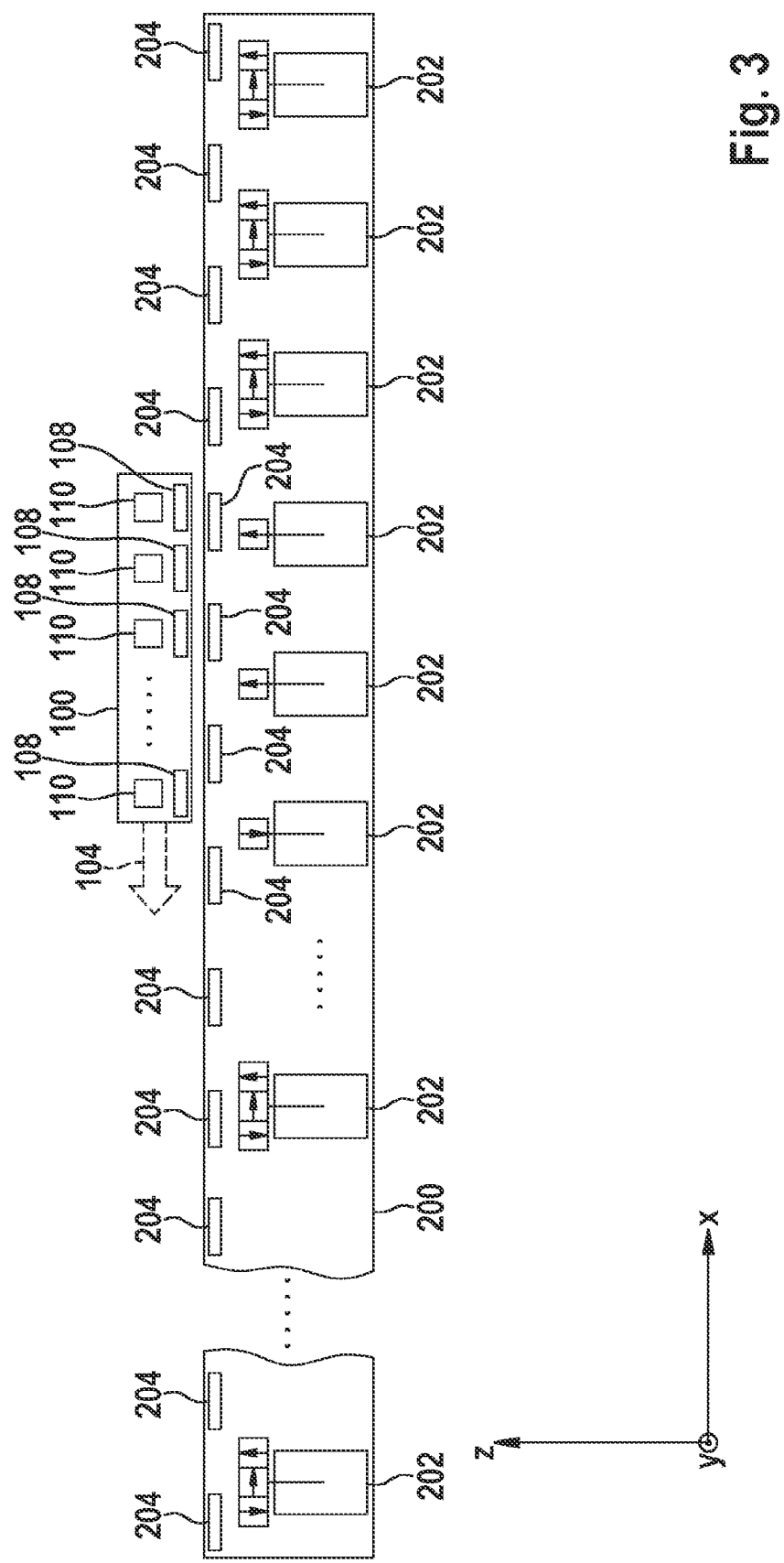
FIG. 3 shows a schematic representation of the device and the conveyor device in a side view, in accordance with an example embodiment of the present invention.

In FIG. 3, conveyor device 200 and device 100 are shown in a side view. The reference numerals for elements which are already described in FIG. 1 and FIG. 2 are retained in FIG. 3. In the Halbach array, the arrow tips indicate the location of the magnetic north pole of the particular permanent magnets.

Device 100 is located in the view shown in FIG. 3 at a distance from conveyor device 200. The distance is generated in the example by the superimposed magnetic fields of the permanent magnets. The distance is shown uniformly in FIG. 3. Due to pitch and/or roll movements, in particular also with yaw movements, an unequal distance of individual areas of device 100 from conveyor device 200 may occur. A regulation or control of a movement and the distance of device 100 with respect to conveyor device 200 is described hereinafter.

Figure 4:
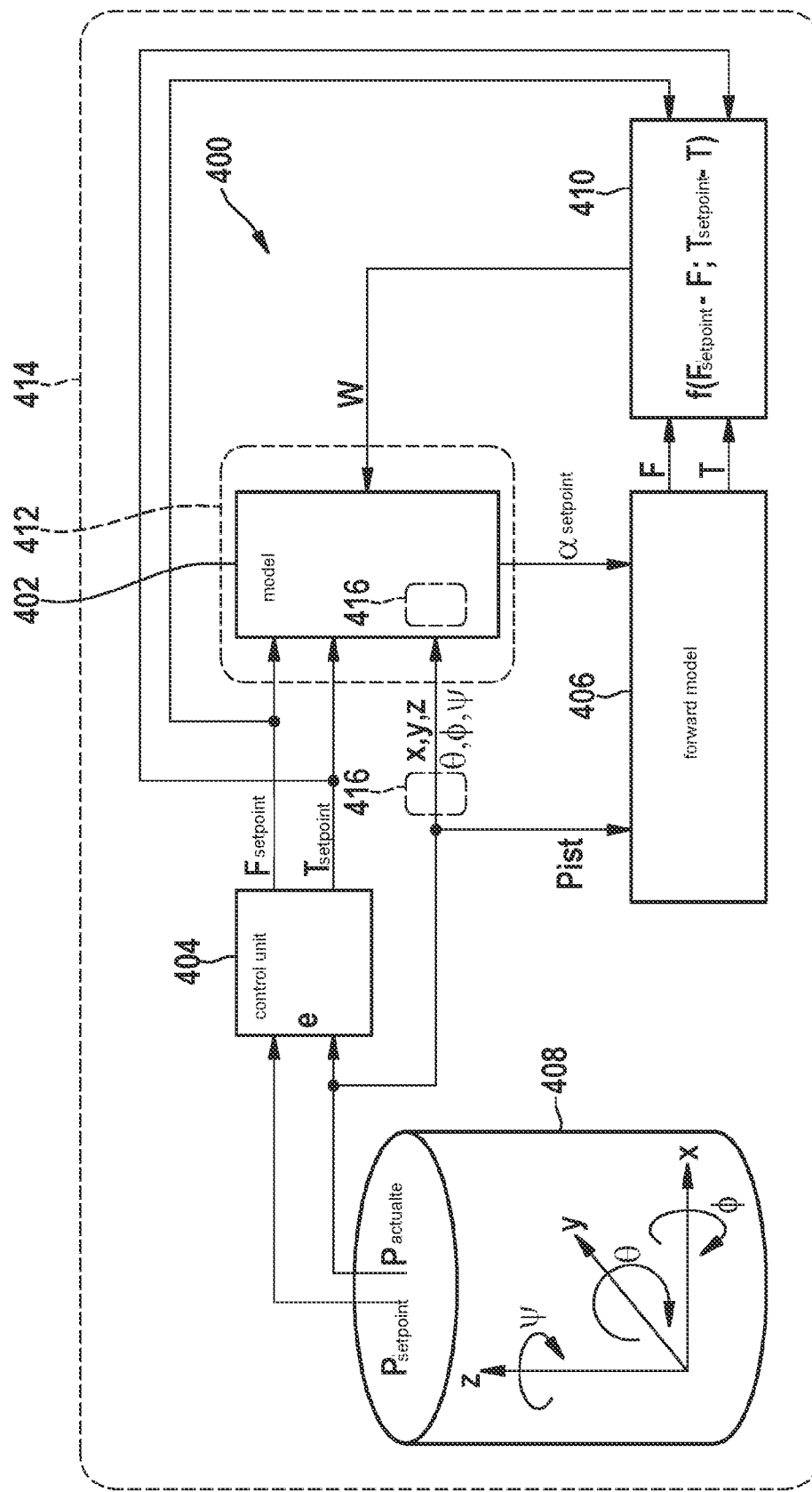
FIG. 4 shows a schematic view of a device for activating the conveyor device with a training device, in accordance with an example embodiment of the present invention.

A device 400 for activating conveyor device 200 is schematically shown in FIG. 4. Device 400 includes a model 402 and a control unit 404. Device 400 optionally includes a forward model 406, a database 408, and a training device 410 for a training of model 402. Device 400 includes at least one memory 412 for model 402 and at least one computing device 414. Computing device 414 and memory 412 are designed in the example to carry out the method described hereinafter.

In database 408, information about a plurality of actual values for the pose is stored for a training of model 202. In the example, Pactual denotes an actual value of a pose and Psetpoint denotes a setpoint value for a pose.

Control unit 404 is designed to determine, as a function of an actual value of a pose Pactual and a setpoint value of a pose Psetpoint, a control deviation e and to determine, as a function of control deviation e, a setpoint value for a torque Tsetpoint and a setpoint value for a force Fsetpoint, using which device 100 is to be moved by conveyor device 200.

Control unit 404 may be a state regulator, for example, an LQ controller, which is designed to determine setpoint value for torque Tsetpoint and setpoint value for force Fsetpoint as a function of a predefinable trajectory. Control unit 404 may be designed to determine, as a function of a gravitational force acting on device 100, a pilot control value for setpoint value for torque Tsetpoint and/or setpoint value for force Fsetpoint, which at least partially compensates for the gravitational force.

The gravitational force is determined in the example as a function of a weight of device 100 and/or as a function of a weight of an object which device 100 carries or is predefined as a parameter. The weight may be determined or predefined as a parameter.

In the example, the poses are vectors including elements x, y, z, ϕ, θ, Ψ and control deviation e is a vector including elements for corresponding differences of the individual elements. In the example, control unit 404 includes a first PID controller, which determines setpoint value for force Fsetpoint as a function of the elements of control deviation e, which indicate the control deviation with respect to position x, y, z. In the example, control unit 404 includes a second PID controller, which determines setpoint value for torque Tsetpoint as a function of the elements of control deviation e, which indicate the control deviation with respect to angles ϕ, θ, Ψ. The PID controllers are regulators having a proportional, an integrating, and a differentiating component. Other deterministic control units may also be used.

An optional filter 416 may be provided, which filters actual values of pose Pactual before model 402 or as part of model 402. No filter 416 is preferably used for a training.

Model 402 is designed to determine, as a function of actual value for pose Pactual, setpoint value for torque Tsetpoint, and setpoint value for force Fsetpoint, a setpoint value αsetpoint for the activation of at least one actuator 202 of conveyor device 200. Model 402 is already trained in one aspect to determine, as a function of setpoint values for poses, setpoint values for torques, and setpoint values for forces, setpoint values for the activation of the at least one actuator 202. Further input variables for model 402 may include historic data of poses or actual values of the at least one actuator 202. Model 402 is designed in another aspect, using training device 410, as a function of setpoint values for poses, setpoint values for torques, and setpoint values for forces, to be trained using setpoint values for the activation of the at least one actuator 202. Training device 410 is designed to determine at least one parameter W for model 402. In the example, training device 410 is designed to determine a plurality of parameters W. Training device 410 is designed in the example to determine parameter W as a function of a cost function, which is defined as a function of a difference between a desired value for force Fdes and a modeled value for force F, on the one hand, and a difference between a desired value for torque Tdes and a modeled value for torque T, on the other hand, for example based on L1 norms.

$$l_1 = \|Fdes - F\| + \|Tdes - T\|$$

For example, the cost function is defined by a sum of the L1 norm of the difference between desired value for force Fdes and modeled value for force F, on the one hand, and the L1 norm of the difference between desired value for torque Tdes and the modeled value for torque T, on the other hand.

In the example, training device 410 is designed to determine a plurality of the differences for a plurality of desired values and actual values assigned to one another and to carry out a gradient descent method, using which parameters W are determined which minimize these differences.

An aspect of device 400 for activating conveyor device 200 is shown in FIG. 5. In this aspect, device 400 includes control unit 404, optionally filter 416, memory 412 for model 402, and computing device 414. Model 402 is already trained in this aspect. The demand on the computing power of computing device 414 which is usable for this device 400 is thus lower than the demand on a computing device 414, which computes in a training method using training device 410 and forward model 406.

It is advantageous if the training method for training model 402 is carried out using forward model 406 in particular to determine the modeled values and training device 410 and subsequently model 402 thus trained is used without training device 410 and without forward model 406 to activate conveyor device 200.

Forward model 406 is used in the training to handle, with a null space, the regulation of six degrees of freedom including 36 actuators in the example.

Instead of supervised learning, in which model 402 learns to determine a setpoint value αsetpoint for rotation angle α for each actuator which corresponds as well as possible to a reference value for setpoint value αsetpoint from the training data, model 402 is trained in the training method to determine a setpoint value αsetpoint for rotation angle α, for which forward model 406 determines a modeled value for torque T and a modeled value for force F, which minimize the cost function. The cost function is a function of the modeled value for torque T, the modeled value for force F, desired value for torque Tdes, and desired value for force Fdes.

Figure 6A:
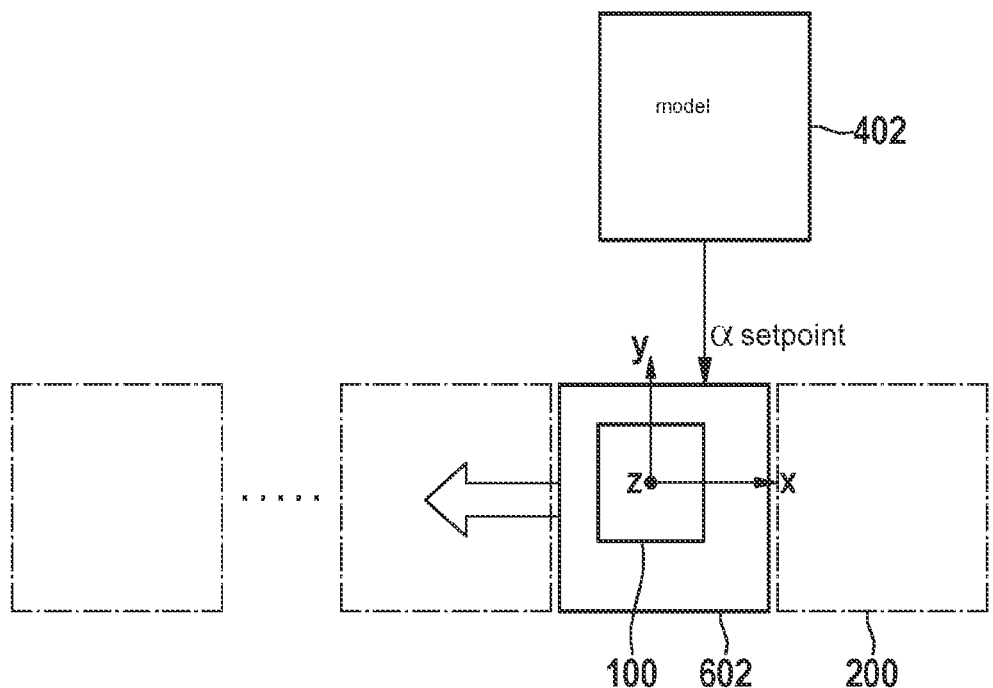
FIG. 6A shows a schematic view of aspects of an activation of a first group of actuators of the conveyor device, in accordance with an example embodiment of the present invention.
Figure 6B:
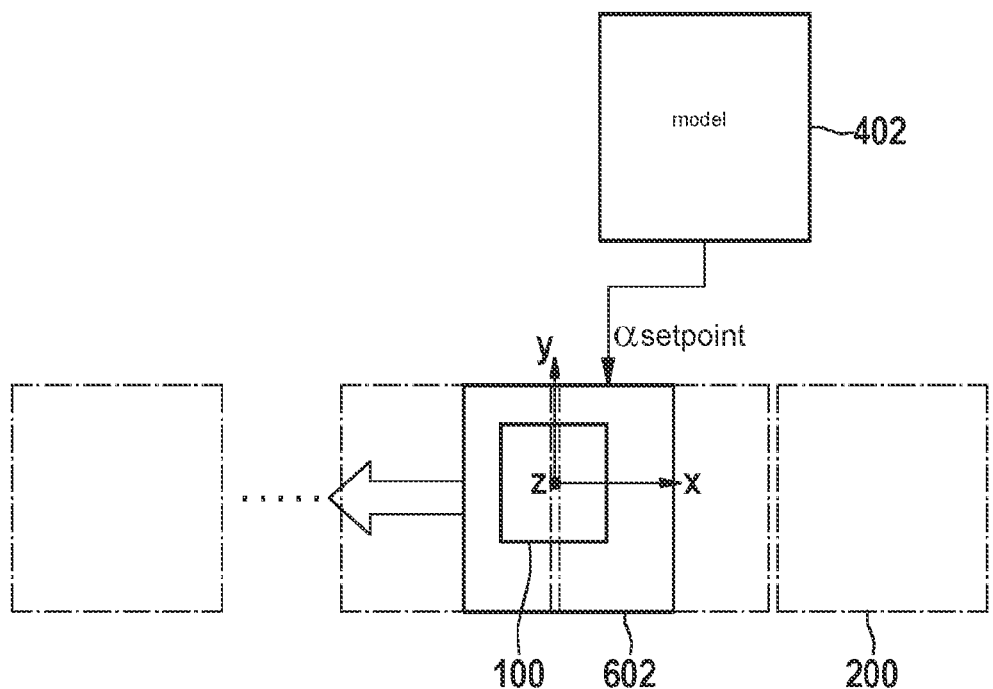
FIG. 6B shows a schematic view of aspects of an activation of a second group of actuators of the conveyor device, in accordance with an example embodiment of the present invention.

It may be provided that, as schematically shown in FIGS. 6A and 6B, only one group 602 of actuators 202 of conveyor device 200 are selected from actuators 202 of conveyor device 200 and jointly activated by model 402. Device 400 is designed in this case for the purpose of determining group 602 of actuators 202 as a function of a present position of device 100. Model 402 is designed in this case to output a setpoint value αsetpoint only for the activation of actuators 202 of group 602 of conveyor device 200.

Two different positions of device 100 on conveyor device 200 are shown in FIGS. 6A and 6B. In FIG. 6A, first actuators 202 of a first group 602 are shown. In FIG. 6B, second actuators 202 of a second group 602 are shown. Due to a continuous position change of device 100, the two groups 602 overlap. In the above-described matrix-shaped arrangement of actuators 202, second actuators 202 are determined, for example, in that actuators 602 of the right side of group 602 shown in FIG. 6A are removed from first group 602, assigned to remaining actuators 202 of second group 602, and one column of actuators are newly added on the left side of second group 602 shown in FIG. 6B. The origin of the Cartesian coordinate system from FIG. 6A is accordingly shifted to the left for FIG. 6B. Control unit 404 determines continuous values for the shift of the origin on the basis of control deviation e, since setpoint values for poses Psetpoint thus also shift like actual values for poses Factual.

Model 402 determines in this aspect setpoint value αsetpoint only for the activation of actuators 202 of first group 602 which are activated for the movement of device 100. When device 100 moves, instead of first group 602, second group 202 is activated. Since the configuration of actuators 202 of first group 602 differs from the configuration of actuators 202 of second group 602, a discontinuity may occur upon the transition from first group 602 to second group 602. In the example, actuators 202 of first group 602 are situated in a first matrix in which indices of columns and rows in the first matrix define an actual position of actuator 202 of first group 602. For second group 602, a second matrix is defined accordingly. Various actuators 202, having an inter-actuator distance to one another in columns and rows in this example, are situated in the space in the form of a matrix. An actual pose is defined in the space for first group 602. An actual pose shifted in relation to the actual pose is defined in the space for second group 602. The discontinuity relates in this example to actuators 202, which are substituted in first group 602 and in second group 602 when either the index for the column or the index for the row or both indices change due to a shift of device 100 with respect to conveyor device 200. In the training, for each actual position of an actuator 202, in each case an actual position shifted by precisely the inter-actuator distance is also given in the training data. The cost function is, for example, additively expanded in this case so that actuator 202, which is physically the same, but whose matrix index is changed due to the shifted position, has the same setpoint value αsetpoint assigned in both cases, thus the difference is zero.

This is achieved in that for the training a coordinate system for setpoint value for pose Psetpoint and actual value for pose Pactual is defined using an origin. A location of the origin with respect to conveyor device 200 is determined in this aspect as a function of a movement of device 100 with respect to conveyor device 200. In the example, a spatial position of the origin is determined for first group 602 with respect to actuators 202 of first group 602. Upon a transition from first group 602 to second group 602, the same location of the origin is determined with respect to actuators 202 of second group 602. In the example, for each of the groups, the same location of the origin is determined in the center of the two-dimensional matrix arrangement of actuators 202 which are assigned to the particular group.

For the training, setpoint value for pose Psetpoint and actual value for pose Pactual are indicated with respect to this origin. Model 404 thus trained is usable for each of the groups, since for model 402, in the event of a change of the location of the origin, no jump of setpoint value αsetpoint and no jump of actual value for pose Pactual occurs.

An exemplary additional quality measure for this purpose is defined by setpoint values αsetpoint determined by model 402, for example based on an L1 norm, as $$l_2 = \|g(\alpha \text{setpoint}) - f(\alpha \text{setpoint\_shifted})\|$$

g and f being sorting functions, which are defined, for example, by a particular characteristic map which assigns a target value to a setpoint value. For example, the cost function is defined by an L1 norm of a difference of a result vector of sorting function g for setpoint value αsetpoint and a result vector of sorting function f for a shifted setpoint value αsetpoint_shifted.

In the example, the setpoint value may be implemented as a vector for the actual pose. The setpoint value is ascertained by resorting the elements of the vector, so that physically the same actuator 202 receives the same vector index under the shifted actual pose after the resorting for the calculation of the quality measure. Actuators 202 which are not present in both groups are sorted out by sorting functions g and f.

In the training of this model 402, for example, an optimization is determined with the aid of the sum of quality measure $l_1$ and additional quality measure $l_2$.

Figure 7:
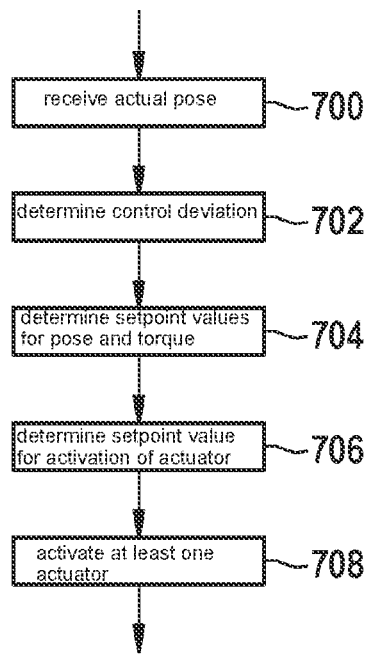
FIG. 7 shows steps in a method for activating the conveyor device, in accordance with an example embodiment of the present invention.

A method for activating conveyor device 200 is described hereinafter on the basis of FIG. 7. This method may be carried out using device 400, without a database 408, a forward model 406, and a training device 410 being required in device 400. Rather, this method may be carried out solely using control unit 404 and trained model 402.

The method for activating conveyor device 200 provides that in a step 700, an actual value for a pose Pactual of a device 100 movable by conveyor device 200 by a magnetic force action is received. Subsequently, a step 702 is carried out.

In step 702, control deviation e for control unit 404 is determined as a function of actual value for pose Pactual and a setpoint value for pose Psetpoint. Setpoint value for pose Psetpoint may be predefined arbitrarily. In the example, setpoint value for pose Psetpoint is predefined in such a way that device 100 is moved with consistent distance from conveyor device 200 and following a profile of conveyor device 200. Subsequently, a step 704 is carried out.

Control unit 404 may be the state regulator, in particular the LQ controller. In this case, the trajectory for setpoint values for pose Psetpoint may be predefined In step 704, as a function of actual value for pose Pactual and setpoint value for pose Psetpoint, setpoint value for torque Tsetpoint and setpoint value for force Fsetpoint are determined, using which device 100 is to be moved by conveyor device 200.

In step 704, in the example setpoint value for torque Tsetpoint and setpoint value for force Fsetpoint are determined by control unit 404 as a function of control deviation e. Subsequently, a step 706 is carried out.

If control unit 404 is the state regulator, setpoint value for torque Tsetpoint and setpoint value for force Fsetpoint may be determined as a function of the trajectory.

It may be provided that as a function of a gravitational force acting on device 100, a pilot control value is determined for setpoint value for torque Tsetpoint and/or setpoint value for force Fsetpoint which at least partially compensates for the gravitational force.

In step 706, as a function of actual value for pose Psetpoint, setpoint value for torque Tsetpoint, and setpoint value for force Fsetpoint, and as a function of model 402, a setpoint value αsetpoint is determined for the activation of at least one actuator 202 of conveyor device 200.

Model 402 is trained to determine setpoint values for the activation of the at least one actuator 202 as a function of setpoint values for poses, setpoint values for torques, and setpoint values for forces.

The at least one actuator 202 is designed to be rotatable with respect to conveyor device 200 in one aspect. Setpoint value αsetpoint for the at least one actuator 202 characterizes in this aspect a rotation angle for actuator 202 with respect to conveyor device 200. Subsequently, a step 708 is carried out. An increment may also be provided for this rotation angle starting from a present rotation angle of actuator 202.

In step 708, the at least one actuator 202 is activated as a function of setpoint value αsetpoint for the activation of at least one actuator 202. If not all actuators 202 are activated, actuators 202 which are not activated still generate the same magnetic field. A magnetic force action which moves device 100 is thus generated by a superposition of the magnetic fields of actuators 202 in the area in which device 100 is located.

In the example, the at least one actuator 202 includes a Halbach array, by which the magnetic field for influencing the movement of device 100 is generatable. In the example, model 402 is trained to determine a plurality of setpoint values αsetpoint for rotation angles α of various actuators 202. In steps 706 and 708, a magnetic field for moving device 100 is generatable by a superposition of magnetic fields which are generatable by the Halbach array of the plurality of different actuators 202. Model 402 is trained in this example to determine 706 the plurality of setpoint values αsetpoint for rotation angles α of various actuators 202 in such a way that the magnetic field moves device 100 essentially using the torque predefined by setpoint value for torque Tsetpoint and the force predefined by setpoint value for force Fsetpoint. Since a forward model does not have to be determined for this purpose, this procedure is very efficient and therefore requires significantly less computing power and/or computing time in relation to the use of a forward model Steps 700 through 708 are carried out repeatedly in this example in this order for a sequence of setpoint values Psetpoint for the pose. Device 100 is thus moved using conveyor device 200. The method subsequently ends.

Steps 700 through 708 were described for actuators 202 which include permanent magnets. For actuators 202 which include an electromagnetic element, a corresponding method is used to generate a magnetic field to move device 100. Model 402 is trained in this case to determine a plurality of setpoint values Isetpoint for various actuators 202 in step 706. Isetpoint denotes in the example a current using which an electromagnetic field is to be generated by the electromagnetic element.

A magnetic field for moving device 100 is generated in this case by a superposition of magnetic fields of a plurality of the electromagnetic elements of various actuators 202 with a magnetic field of at least one electromagnet or permanent magnet at device 100.

Model 402 is trained to determine the plurality of setpoint values Isetpoint for various actuators 202 in step 706 in such a way that the magnetic field in step 708 moves device 100 essentially using the torque predefined by setpoint value for torque Tsetpoint and the force predefined by setpoint value for force Fsetpoint.

In one example, model 402 includes an artificial neural network, in particular including a multilayer perceptron architecture. A setpoint value αsetpoint is determined, for example, as a function of values of an output layer of the artificial neural network. The artificial neural network is designed in the example for a regression of rotation angles. The output layer, for example, continuously outputs output values as floating-point numbers, the output values continuously defining rotation angles between 0° and 359° within the scope of the accuracy of the floating-point numbers. In this example, the rotation angle for one of actuators 202 is set as a function of the initial value.

For the determination of the plurality of setpoint values αsetpoint for rotation angles α of various actuators 202, a number of output layers corresponding to the number of actuators 202 may be provided in model 402.

Figure 8:
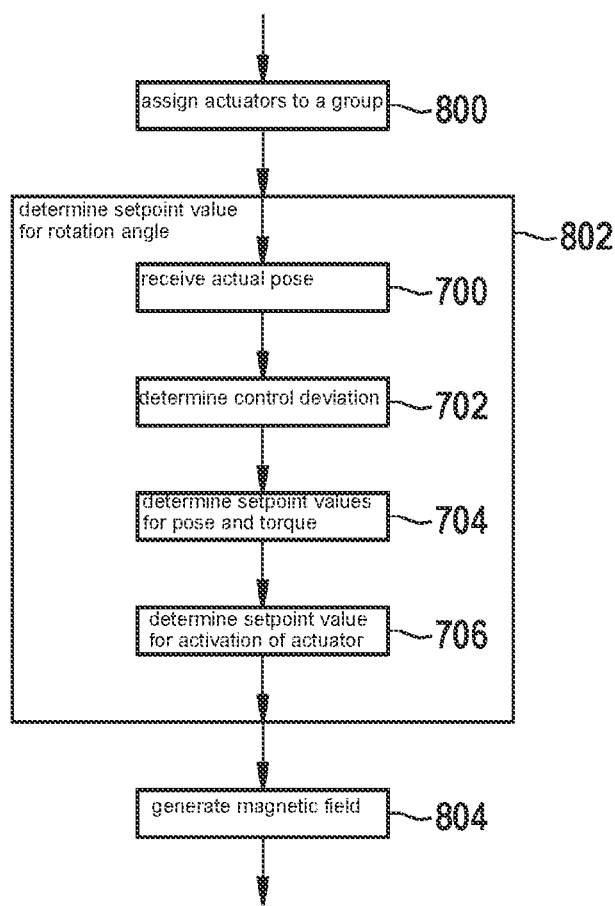
FIG. 8 shows steps in a method for activating a group of actuators of the conveyor device, in accordance with an example embodiment of the present invention.
Figure 9:
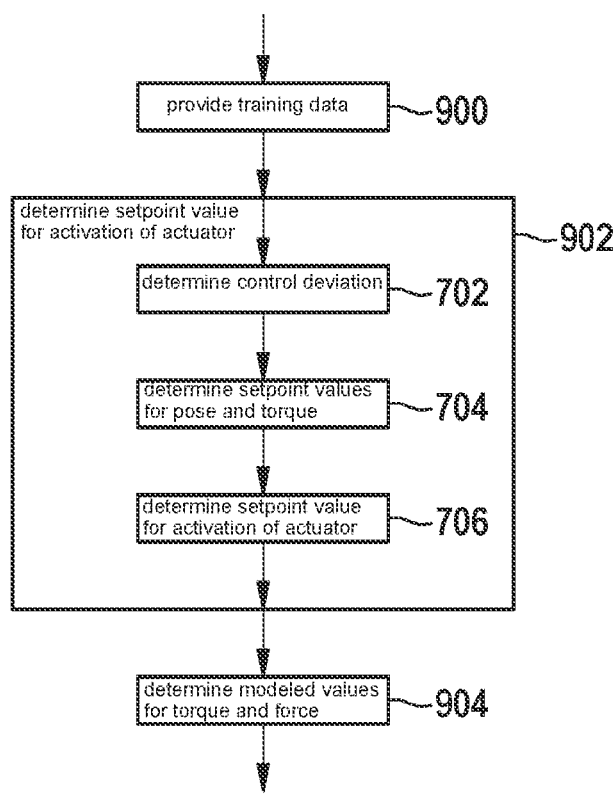
FIG. 9 shows steps in a method for the training for the activation of the conveyor device, in accordance with an example embodiment of the present invention.

It may be provided that several of actuators 202 in group 602 are combined. Model 402 may include outputs only for actuators 202 of group 602 in this case. In this case, a correspondingly modified method is used to activate conveyor device 200, which is described hereinafter with reference to FIG. 8.

In a step 800, as a function of actual value for pose Pactual, a plurality of actuators 202 is assigned to a group 602 of actuators 202. Group 602 is defined, for example, as a 6×6 matrix of actuators 202, which are situated in a top view of conveyor device 200 in a square area, over which device 100 is presently held floating by the magnetic forces. The assignment takes place in the example as a function of the position determination.

If a plurality of devices 100 are to be movable by conveyor device 200, multiple instances of model 402 may be provided. Each of the instances of model 402 is designed in this case to activate conveyor device 200 to move one of devices 100. Preferably, disjoint groups 602 of actuators 202 are defined for this purpose and each of groups 602 is activated by another of models 402.

In a step 802, a particular setpoint value αsetpoint for rotation angle α is determined for the plurality of actuators 202 of group 602. In the example, model 402 trained for the number of actuators 202 from group 602 is used. Particular setpoint value αsetpoint is determined in the example as described in steps 700 through 706.

In a step 804, the magnetic field for influencing the movement of device 100 is only generated by a group 602 of actuators 202.

Steps 800 through 804 are repeated as a function of the information about actual value Pactual of the pose. Different actuators 202 are thus grouped in various groups 602 and activated.

The method for activating conveyor device 200 may be used for training model 402.

For the training of model 402, in a step 900, training data are provided, in particular from database 408. The training data include values from a value range valid for the particular desired value. The training data are either predefined or are drawn in the training from a random distribution. In the example, the training data each include a pose Pactual, a desired value for the torque, and a desired value for the force, which are assigned to one another as a tuple. In the example, one of the tuples is randomly drawn in step 900. Subsequently, a step 902 is carried out.

In step 902, a setpoint value αsetpoint for the activation of the at least one actuator 202 of conveyor device 200 is determined as a function of the tuple drawn.

For this purpose, for example, a method as described in step 706 is used.

It may be provided that control unit 404 is used in the training. In this case, a desired value for the torque and a desired value for the force may be determined as a function of drawn pose Pactual and a setpoint value Psetpoint for the pose contained in the tuple. In the example, the training is independent of whether model 402 is trained for all or only for a previously selected group 602 of actuators 202. Subsequently, a step 904 is carried out.

In step 904, a modeled value for the torque and a modeled value for the force are determined as a function of setpoint value αsetpoint for the activation of the at least one actuator 202 of conveyor device 200, independently of actual value for pose Pactual, and as a function of in particular stochastic or deterministic forward model 406 for conveyor device 200 and device 100. Depending on model 402 used, in the example a setpoint value αsetpoint is determined either for all actuators 202 of the conveyor device or for each actuator 202 from group 602 of actuators. Subsequently, a step 906 is carried out.

In step 906, the at least one parameter W of model 402 is determined as a function of a gradient descent method. In the training, it is calculated for the evaluation of this cost function for this gradient descent method by stochastic or deterministic forward model 406 which modeled value for the torque and which modeled value for the force as a function of setpoint value αsetpoint that model 402 has determined would be set by conveyor device 200. In the training, conveyor device 200 is not activated, but rather simulated by forward model 406. In the training, a very precise forward model 406 may be used. The operation of conveyor device 200 after the training may take place without this precise forward model 406.

Parameters W are, for example, weights and/or parameters of activation functions of the artificial neural network. Parameters W may also relate to other parameters of the artificial neural network.

A plurality of pairs of poses Pactual and setpoint values for poses Psetpoint assigned to one another are provided in the example in repetitions of steps 902 through 906. Actual values for torque Tactual and actual values for force Factual are determined as a function of the plurality of pairs and the at least one parameter W of model 402 is determined as a function of poses Pactual from the plurality of pairs and actual values determined for this purpose for torque Tactual and actual values for force Factual in the gradient descent method. The training is carried out, for example, using the function which is defined as a function of the difference between setpoint value for force Fsetpoint and the actual value for force F, on the one hand, and the difference between setpoint value for torque Tsetpoint and the actual value for torque T, on the other hand.

The method ends, for example, when a quality criterion has been met or all provided tuples have been used. The tuples may be provided repeatedly in iterations for training. In this case, the method may then end when a predefined number of iterations has been carried out.

What is claimed is:

1. A method for activating a conveyor device, the method comprising the following steps:
receiving an actual value for a pose of a device movable by the conveyor device by a magnetic force action; and
determining, depending on the actual value for the pose, as a function of a setpoint value for a torque using which the device is to be moved by the conveyor device, as a function of a setpoint value for a force using which the device is to be moved by the conveyor device, and as a function of a model, a setpoint value for activation of at least one actuator of the conveyor device, the model being trained to determine setpoint values for the activation of the at least one actuator as a function of actual values for poses of the device and as a function of setpoint values for torques and setpoint values for forces, using which the device is to be moved.

2. The method as recited in claim 1, wherein the at least one actuator is rotatable with respect to the conveyor device, the setpoint value for the at least one actuator characterizing a rotation angle for the actuator with respect to the conveyor device or an increment for the rotation angle starting from a present rotation angle of the actuator, and the at least one actuator is activated as a function of the setpoint value for the activation of the at least one actuator.

3. The method as recited in claim 2, wherein the at least one actuator includes at least one permanent magnet by which a magnetic field is generatable to influence a movement of the device, the model being trained to determine a plurality of setpoint values for rotation angles of various actuators.

4. The method as recited in claim 3, wherein the at least one permanent magnet is a Halbach array.

5. The method as recited in claim 3, wherein a magnetic field for moving the device is generatable by a superposition of magnetic fields of a plurality of the at least one permanent magnet of various actuators with a magnetic field of at least one electromagnet or permanent magnet at the device, the model being trained to determine the plurality of setpoint values for the rotation angles of the various actuators in such a way that the magnetic field moves the device using the torque predefined by the setpoint value for the torque and the force predefined by the setpoint value for the force.

6. The method as recited in claim 1, wherein the at least one actuator includes an electromagnetic element, by which a magnetic field for moving the device is generatable, the model being trained to determine a plurality of setpoint values for various actuators.

7. The method as recited in claim 6, wherein a magnetic field for moving the device is generatable by a superposition of magnetic fields of a plurality of the electromagnetic elements of various actuators with a magnetic field of at least one electromagnet or permanent magnet at the device, the model being trained to determine the plurality of the setpoint values for the various actuators in such a way that the magnetic field moves the device using the torque predefined by the setpoint value for the torque and the force predefined by the setpoint value for the force.

8. The method as recited in claim 1, wherein as a function of the actual value for the pose, a plurality of actuators is assigned to a group of actuators, a magnetic field for influencing a movement of the device being generated only by the group of actuators.

9. The method as recited in claim 1, wherein a control deviation for a control unit is determined as a function of the actual value for the pose and a setpoint value for the pose, the control unit determining the setpoint value for the torque and the setpoint value for the force as a function of the control deviation.

10. The method as recited in claim 9, wherein the control unit is a state regulator, the state regulator being an LQ controller, a trajectory for setpoint values for the pose being predefined, and the setpoint value for the torque and the setpoint value for the force being determined as a function of the trajectory.

11. The method as recited in claim 9, wherein, as a function of a gravitational force acting on the device, a pilot control value is determined for the setpoint value for the torque and/or the setpoint value for the force, which at least partially compensates for the gravitational force.

12. The method as recited in claim 1, wherein, for a training of the model, a modeled value for the torque and a modeled value for the force are determined as a function of the setpoint value for the activation of the at least one actuator of the conveyor device and as a function of a stochastic or deterministic forward model of the conveyor device and the device, at least one parameter of the model being determined as a function of the modeled value for the torque, the modeled value for the force, a desired value for the torque, and a desired value for the force.

13. The method as recited in claim 12, wherein a plurality of tuples including a pose, a desired value for the torque, and a desired value for the force are provided, the at least one parameter of the model being determined as a function of the plurality of tuples in a gradient descent method.

14. A device for activating a conveyor device, the device comprising:
at least one computing device; and
at least one memory for a model and a control unit;
wherein the device is configured to activate a conveyor device, the device being configured to:
receive an actual value for a pose of a device movable by the conveyor device by a magnetic force action; and
determining, depending on the actual value for the pose, as a function of a setpoint value for a torque using which the device is to be moved by the conveyor device, as a function of a setpoint value for a force using which the device is to be moved by the conveyor device, and as a function of the model, a setpoint value for activation of at least one actuator of the conveyor device, the model being trained to determine setpoint values for the activation of the at least one actuator as a function of actual values for poses of the device and as a function of setpoint values for torques and setpoint values for forces, using which the device is to be moved.

15. A non-transitory computer-readable storage medium on which is stored a computer program for activating a conveyor device, the computer program, when executed by a computer, causing the computer to perform the following steps:
- receiving an actual value for a pose of a device movable by the conveyor device by a magnetic force action; and
- determining, depending on the actual value for the pose, as a function of a setpoint value for a torque using which the device is to be moved by the conveyor device, as a function of a setpoint value for a force using which the device is to be moved by the conveyor device, and as a function of a model, a setpoint value for activation of at least one actuator of the conveyor device, the model being trained to determine setpoint values for the activation of the at least one actuator as a function of actual values for poses of the device and as a function of setpoint values for torques and setpoint values for forces, using which the device is to be moved.

* * * * *